US012432508B2

(12) United States Patent
Ball et al.

(10) Patent No.: US 12,432,508 B2
(45) Date of Patent: Sep. 30, 2025

(54) PASSIVE HEARING IMPLANT

(71) Applicant: MED-EL Elektromedizinische Geraete GmbH, Innsbruck (AT)

(72) Inventors: Geoffrey R. Ball, Axams (AT); Alexander Hofer, Absam (AT)

(73) Assignee: MED-EL Elektromedizinische Geraete GmbH, Innsbruck (AT)

( * ) Notice: Subject to any disclaimer, the term of this patent is extended or adjusted under 35 U.S.C. 154(b) by 1024 days.

(21) Appl. No.: 17/279,031

(22) PCT Filed: Sep. 23, 2019

(86) PCT No.: PCT/US2019/052329

§ 371 (c)(1),
(2) Date: Mar. 23, 2021

(87) PCT Pub. No.: WO2019/237133

PCT Pub. Date: Dec. 12, 2019

(65) Prior Publication Data

US 2022/0201411 A1 Jun. 23, 2022

Related U.S. Application Data

(60) Provisional application No. 62/735,219, filed on Sep. 24, 2018.

(51) Int. Cl.
*H04R 25/00* (2006.01)

(52) U.S. Cl.
CPC ....... *H04R 25/606* (2013.01); *H04R 2225/67* (2013.01)

(58) Field of Classification Search
CPC .............. H04R 25/606; H04R 2225/67; H04R 2460/13
See application file for complete search history.

(56) References Cited

U.S. PATENT DOCUMENTS 5,456,654 A * 10/1995 Ball ..................... H04R 25/606 607/57
6,099,462 A * 8/2000 aWengen ............. H04R 25/606 600/25

(Continued)

FOREIGN PATENT DOCUMENTS

DE 200 14 659 U1 11/2000
WO WO-2004067061 A2 * 8/2004 ........... H04R 25/606

OTHER PUBLICATIONS

Dinces, E. A., & Parikh, S. R. (2003). Implantable hearing aids for moderate-to-severe hearing loss. Operative Techniques in Otolaryngology-Head and Neck Surgery, 14(4), 277-281. https://doi.org/10.1053/s1043-1810(03)00060-5 (Year: 2003).*

(Continued)

*Primary Examiner* — Charles A Marmor, II
*Assistant Examiner* — Marc D. Honrath
(74) *Attorney, Agent, or Firm* — Barclay Damon LLP

(57) ABSTRACT

A middle ear implant system includes a disc-shape vibration surface that is configured for implantation within skin lying over skull bone of a patient, with the disc-shape vibration surface parallel to an outer surface of the skin and to the skull bone so that sound vibrations striking the outer surface of the skin create corresponding vibrations in the disc-shape vibration surface within the skin. A rigid ossicle connector has a proximal end connected to the disc-shape vibration surface and a distal end connected to an ossicle in the middle ear of the patient so that vibrations of the disc-shape vibration surface are mechanically coupled to the ossicle for perception by the patient as sound.

15 Claims, 10 Drawing Sheets

(56) References Cited

U.S. PATENT DOCUMENTS

| | | | | |
|---|---|---|---|---|
| 2002/0019668 | A1 | 2/2002 | Stockert et al. | |
| 2008/0208337 | A1 | 8/2008 | Awengen et al. | |
| 2008/0255406 | A1 | 10/2008 | Ball et al. | |
| 2009/0043149 | A1 * | 2/2009 | Abel | H04R 17/02<br>600/25 |
| 2014/0086424 | A1 | 3/2014 | Buehlmann et al. | |
| 2014/0343626 | A1 | 11/2014 | Thenuwara et al. | |
| 2016/0234613 | A1 | 8/2016 | Westerkull | |
| 2017/0094429 | A1 * | 3/2017 | Bervoets | H04R 25/606 |
| 2017/0325034 | A1 | 11/2017 | Santek | |
| 2018/0125641 | A1 | 5/2018 | Kartush | |

OTHER PUBLICATIONS

Sockalingam, R. (Feb. 16, 2015). Implantable auditory technologies. AudiologyOnline. https://www.audiologyonline.com/articles/implantable-auditory-technologies-13250 (Year: 2015).*

European Patent Office, Extended European Search Report, Application No. 19816182.0, dated May 16, 2022, 8 pages.

International Searching Authority/US, International Search Report and Written Opinion of the International Searching Authority, Application No. PCT/US2019/052329, mailed Nov. 15, 2019, 11 pages.

* cited by examiner

PASSIVE HEARING IMPLANT

This application is the national phase entry of International Patent Application No. PCT/US2019/052329 filed Sep. 23, 2019, which claims priority from U.S. Provisional Patent Application 62/735,219, filed Sep. 24, 2018, the disclosures of which is are incorporated herein by reference in its their entirety.

FIELD OF THE INVENTION

The present invention relates to medical implants, and more specifically, to a novel middle ear implant system.

BACKGROUND ART

A normal ear transmits sounds as shown in FIG. 1 through the outer ear 101 to the tympanic membrane 102 which moves the ossicles of the middle ear 103 that vibrate the oval window 106 and round window 107 membranes of the cochlea 104. The cochlea 104 is a long narrow duct wound spirally about its axis for approximately two and a half turns. The cochlea 104 forms an upright spiraling cone with a center called the modiolar where the spiral ganglion cells of the cochlear nerve 105 reside. In response to received sounds transmitted by the middle ear 103, the fluid-filled cochlea 104 functions as a transducer to generate electric pulses which are transmitted by the cochlear nerve 105 to the brain.

Hearing is impaired when there are problems in the ability to transduce external sounds into meaningful action potentials along the neural substrate of the cochlea. To improve impaired hearing, auditory prostheses have been developed. For example, when the impairment is related to operation of the middle ear, a conventional hearing aid, a middle ear implant, or a bone conduction implant may be used to provide acoustic-mechanical stimulation to the auditory system in the form of amplified sound. Or when the impairment is associated with the cochlea, a cochlear implant with an implanted stimulation electrode can electrically stimulate auditory nerve tissue with small currents delivered by multiple electrode contacts distributed along the electrode.

Active middle ear implants employ electromagnetic transducers to convert sounds into mechanical vibration of the middle ear 103. A coil winding is held stationary by attachment to a non-vibrating structure within the middle ear 103 and microphone signal current is delivered to the coil winding to generate an electromagnetic field. A magnet is attached to an ossicle within the middle ear 103 so that the magnetic field of the magnet interacts with the magnetic field of the coil. The magnet vibrates in response to the interaction of the magnetic fields, causing vibration of the bones of the middle ear 103. See U.S. Pat. No. 6,190,305, which is incorporated herein by reference.

U.S. Pat. No. 8,246,532 (incorporated herein by reference in its entirety) describes a type of bone conduction implant that delivers a mechanical vibration signal to the cochlea for sound perception in persons with conductive or mixed conductive/sensorineural hearing loss. An implanted bone conduction transducer is affixed beneath the skin to the temporal bone. In response to an externally generated electrical communications signal, the transducer couples a mechanical stimulation signal to the temporal bone for delivery by bone conduction to the cochlea for perception as a sound signal. A certain amount of electronic circuitry also is implanted with the transducer to provide power to the implanted device and at least some signal processing which is needed for converting the external electrical communications signal into the mechanical stimulation signal and mechanically driving the transducer.

SUMMARY OF THE INVENTION

Embodiments of the present invention include a middle ear implant system with a disc-shape vibration surface that is configured for implantation within skin lying over skull bone of a patient, with the disc-shape vibration surface parallel to an outer surface of the skin and to the skull bone so that sound vibrations striking the outer surface of the skin create corresponding vibrations in the disc-shape vibration surface within the skin. A rigid ossicle connector has a proximal end connected to the disc-shape vibration surface and a distal end connected to an ossicle in the middle ear of the patient so that vibrations of the disc-shape vibration surface are mechanically coupled to the ossicle for perception by the patient as sound.

In specific embodiments, the disc-shape vibration surface is a mesh screen, for example, made of titanium. The ossicle connector may have an adjustable length between the proximal end and the distal end and/or may be made of titanium. The ossicle connector may be configured to pass through a surgically created tunnel in the skull bone and/or the ossicle connector may be configured to connect to the ossicle so as to preserve a normal hearing pathway from the tympanic membrane of the patient.

Embodiments may also include an external active vibration component that is attached to the outer surface of the skin and configured to generate the sound vibrations. In such embodiments, one of the disc-shape vibration surface and the external active vibration component includes a permanent magnet and the other includes a magnetic material configured to magnetically cooperate with the disc-shape vibration surface to couple the sound vibrations through the skin to the disc-shape vibration surface. The external active vibration component may include an attachment surface configured for adhesive attachment to the outer surface of the skin to fixedly secure the external active vibration component to the outer surface of the skin. And/or in addition, there may be an implant magnet fixedly attached to the skull bone, and an external holding magnet that is contained within the external active vibration component, wherein the implant magnet and the external holding magnet are configured to magnetically cooperate to fixedly secure the external active vibration component on the outer surface of the skin.

DETAILED DESCRIPTION OF SPECIFIC EMBODIMENTS

Figure 1:
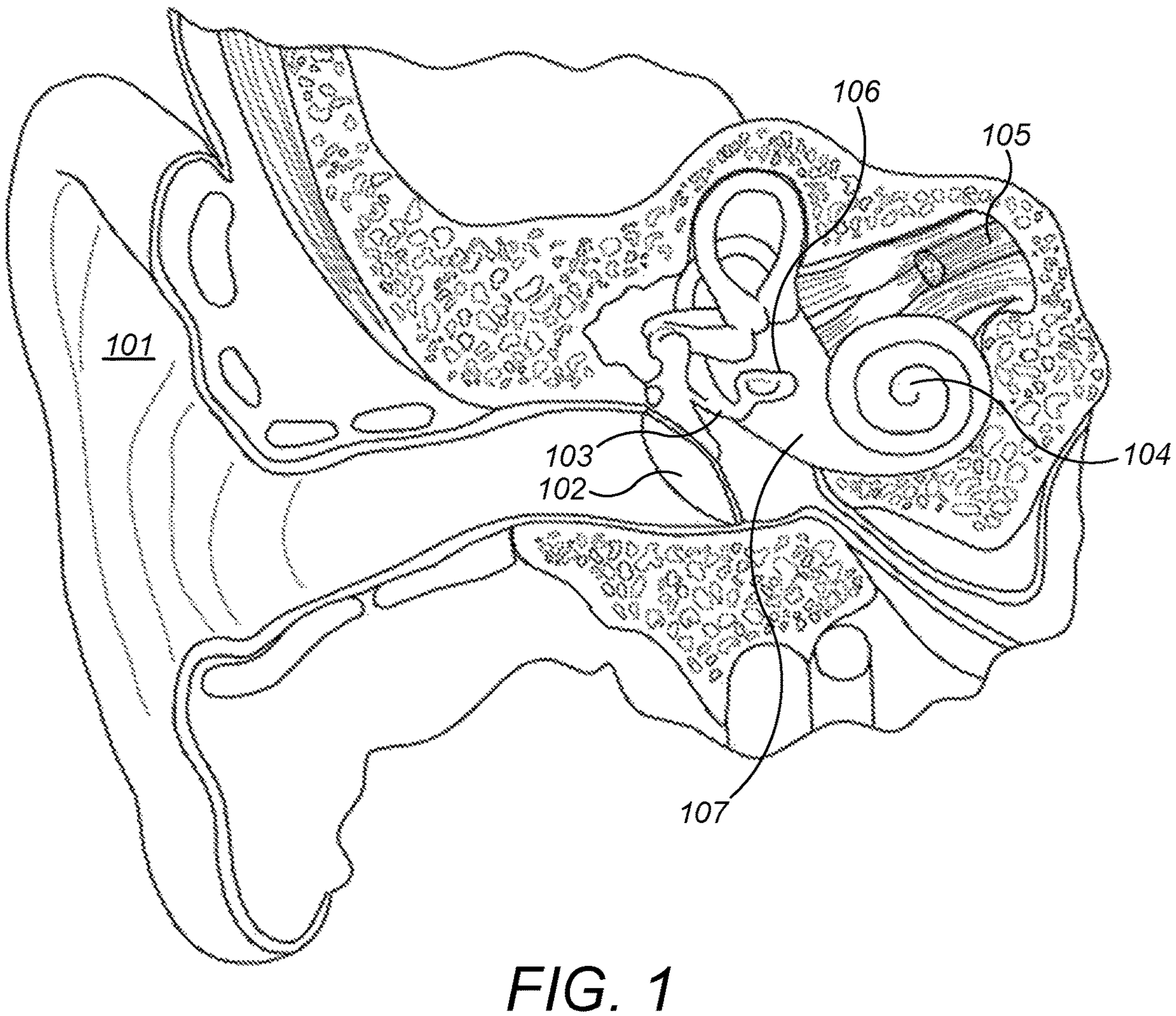
FIG. 1 shows anatomical structures of a typical human ear.
Figure 2A:
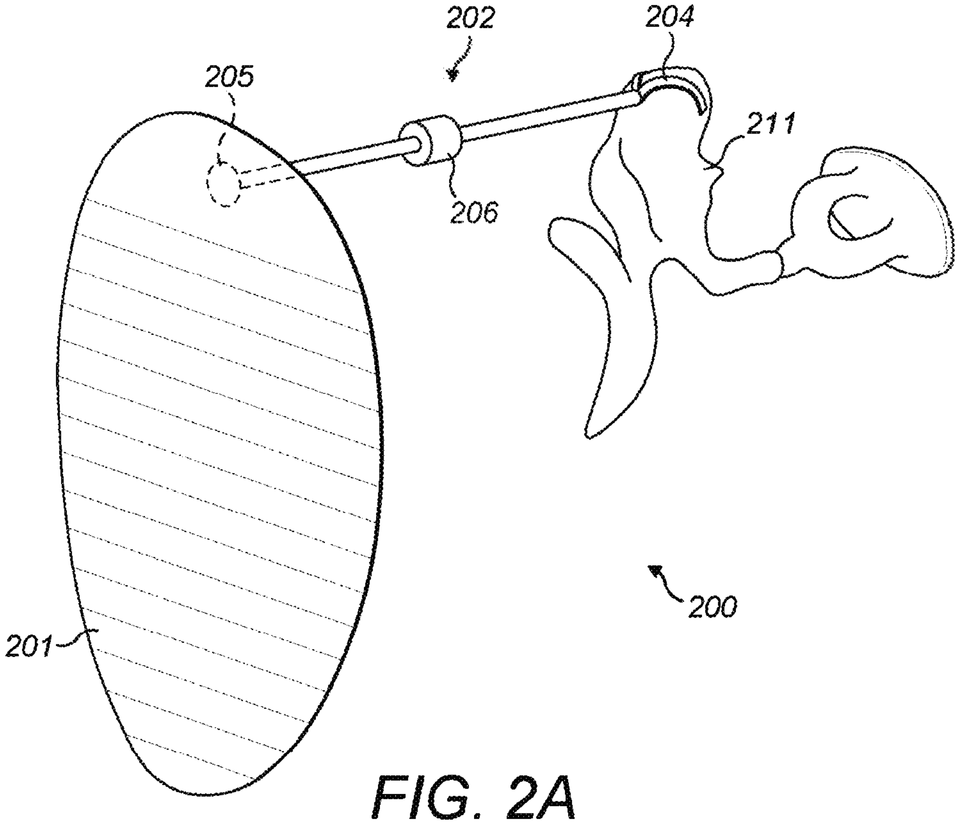
FIGS. 2A-2D show structural details of a disc-shape vibration surface and ossicle connector according to an embodiment of the present invention.
Figure 2B:
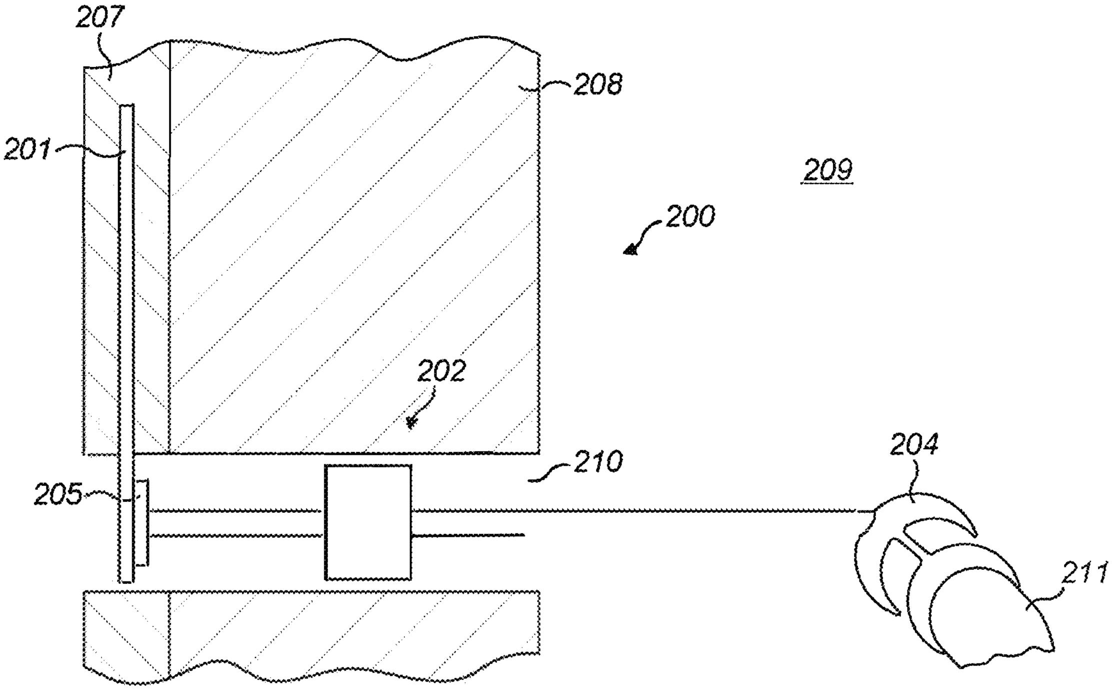

Embodiments of the present invention are directed to an arrangement of a passive hearing implant system that includes a disc-shape vibration surface that is implanted within the soft tissue skin that lies over the skull bone of a patient. FIGS. 2A-2B show structural details of one specific embodiment of a hearing implant system 200 with such a disc-shape vibration surface 201—in this case, in the specific form of a titanium mesh screen—that is configured for implantation in the skin 207 so as to be parallel to an outer surface of the skin 207 and to the skull bone 208 so that sound vibrations striking the outer surface of the skin 207 create corresponding vibrations in the disc-shape vibration surface 201. In a specific embodiment, the disc-shape vibration surface 201 may be curved to fit the shape of the underlying skull bone 208.

A rigid ossicle connector 202 (e.g., made of titanium) has a proximal end 205 that is connected to the disc-shape vibration surface 201 that is embedded in the skin 207. The body of the ossicle connector 202 passes through a surgically excavated tunnel 210 in the skull bone 208 and the distal end 204 of the ossicle connector 202 connects to an ossicle 211 in the middle ear 209 of the patient so that vibrations of the disc-shape vibration surface 201 are mechanically coupled to the ossicle 211 for perception by the patient as sound. The larger the area of the disc-shape vibration surface 201, the better the sound coupling may be. At the same time, the arrangement as shown also preserves a normal hearing pathway from the tympanic membrane of the patient for normal sound perception.

Figure 2C:
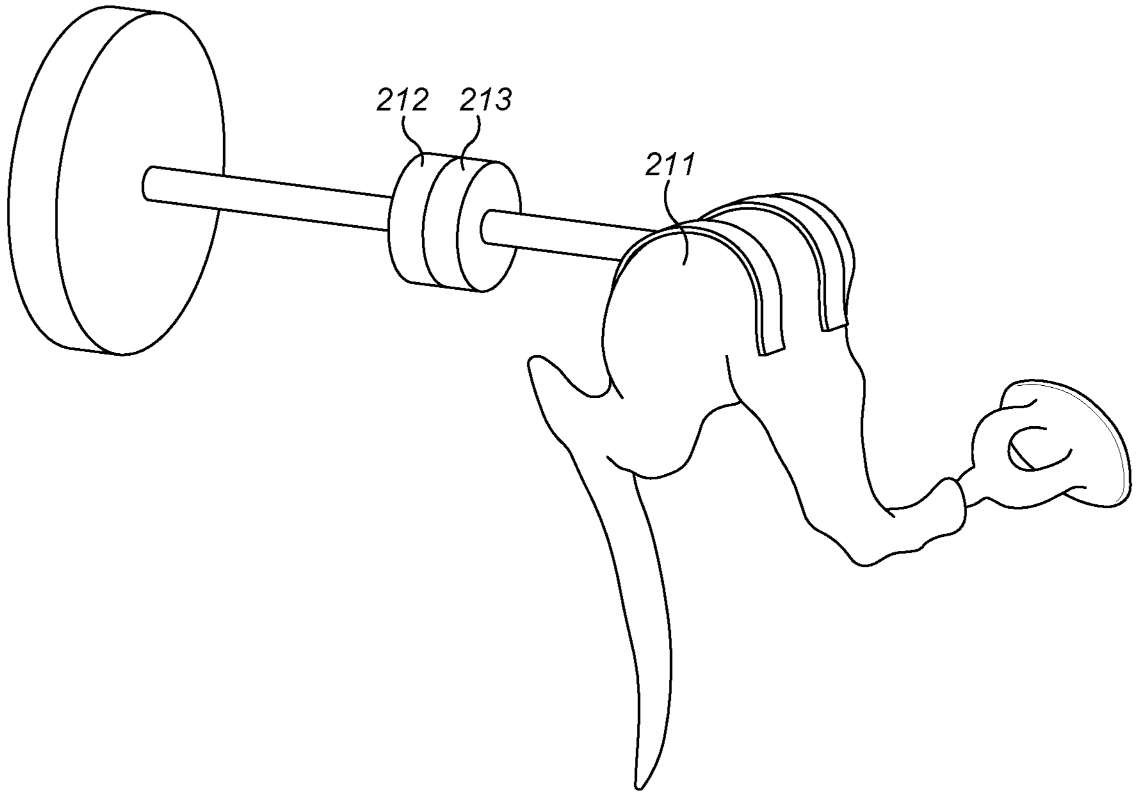
Figure 2D:
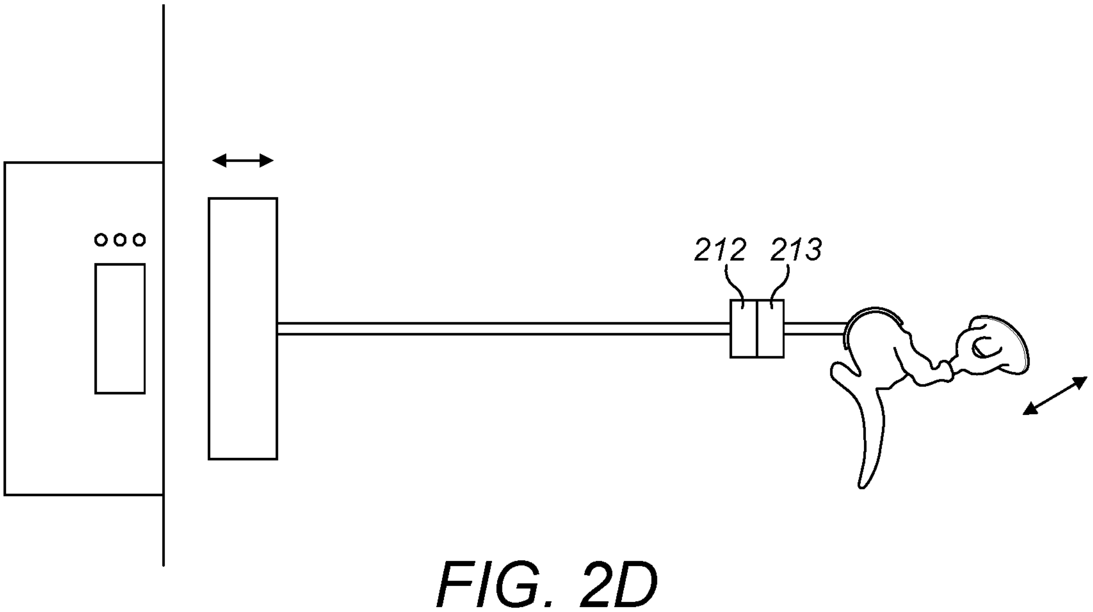

The ossicle connector 202 shown also includes an adjustment mechanism 206 such as a zip-connector style mechanism that allows the surgeon to adjust the length of the ossicle connector 202 when implanting the device. In addition or alternatively, the length of the ossicle connector 202 may also include one or more strain reliefs (such as one or more spring windings). In a further embodiment ossicles connector 202 may in addition or alternatively include a magnetic coupling comprising of holding magnet 212 connected with the proximal end 205 and holding magnet 213 connected with the distal end 204 to releasable connect the proximal end 205 with the distal end 204 of ossicles connector 202, as shown in FIGS. 2C and 2D. Dividing the ossicles connector 202 this way in two separable parts allows for easy length adjustment during surgery, because the magnetic attraction force between holding magnet 212 and holding magnet 213 tightens up ossicles connector 202 through length adjustment by the zip-connector until both magnets are snapped together and securely connect both parts of the ossicles connector 202.

Figure 3A:
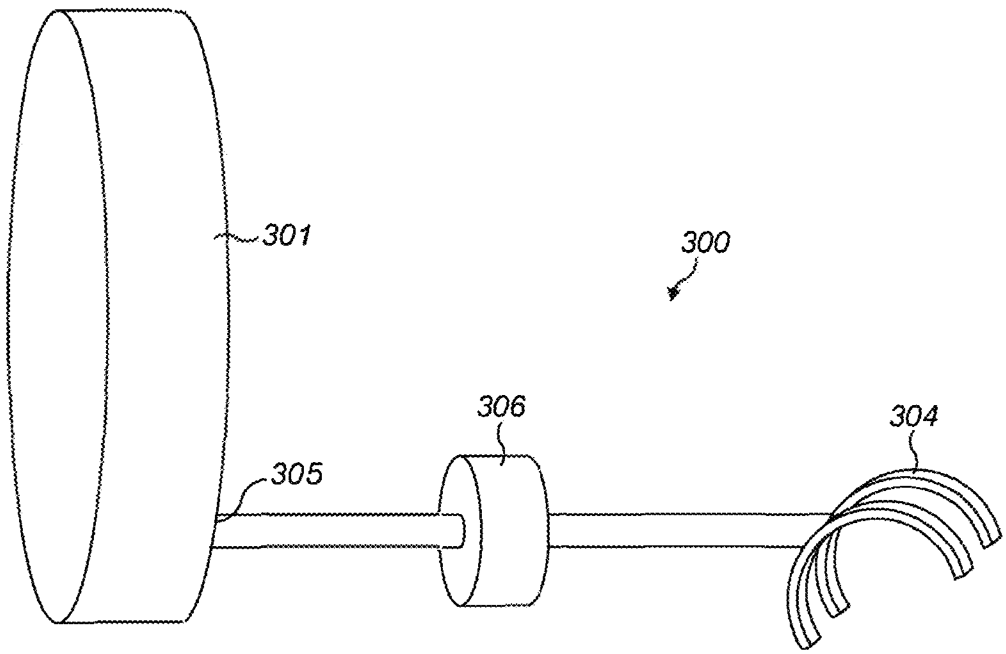
FIGS. 3A-3C show structural details of a disc-shape vibration surface and ossicle connector according to another embodiment of the present invention.
Figure 3B:
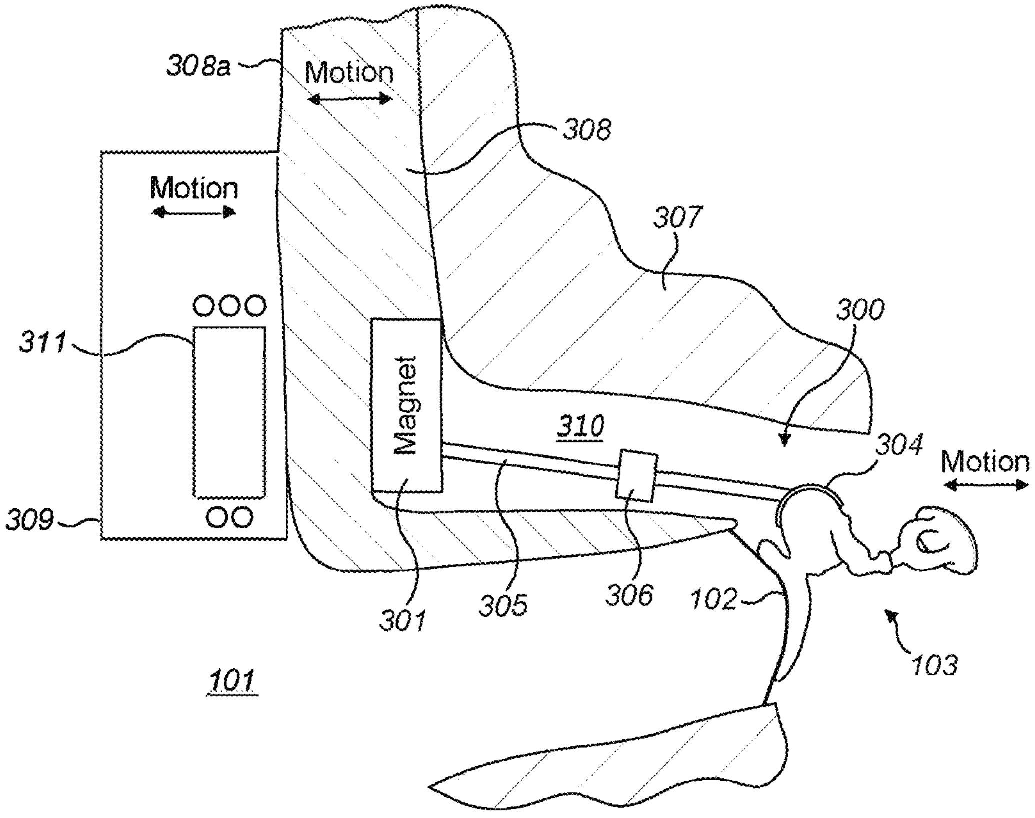
Figure 3C:
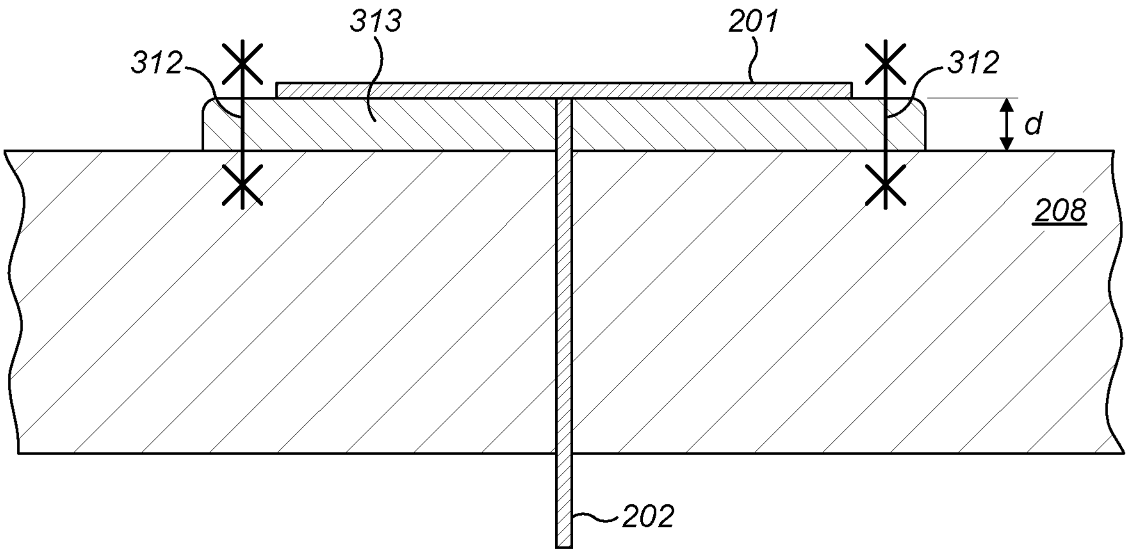

FIGS. 3A-3C show structural details of a disc shape vibration surface 301 and ossicle connector 300 according to another embodiment of the present invention. In one embodiment an active external component 309 comprising a microphone for receiving the sound, processing and amplification means and an output transducer for generating vibrations corresponding to the received sound and application to the outer surface of the skin may in addition be used. In one exemplary embodiment such an external component 309 may be as described in U.S. patent application published under US2016/0192092 to Westerkull, which is hereby included herein by reference. In this embodiment the disc shape vibration surface 301 and active external component 309 may include magnetic material. In one embodiment, a magnet may be placed on the center of the disc shape vibration surface 301 or the disc shape vibration surface 301 may be made of magnetic material or magnetized. Likewise, the active external component 309 may include magnetic material or a magnet 311 between the outer skin surface facing side of the transducer and the outer skin surface, where any combination is possible as long as at least one of the active external component 309 or the disc shape vibration surface 301 includes a magnet. This way through magnetically cooperation, vibrations generated with the transducer of the external component 309 on the outer surface of the skin can more efficiently create corresponding vibrations of the disc shape vibration surface 301.

Figure 3D:
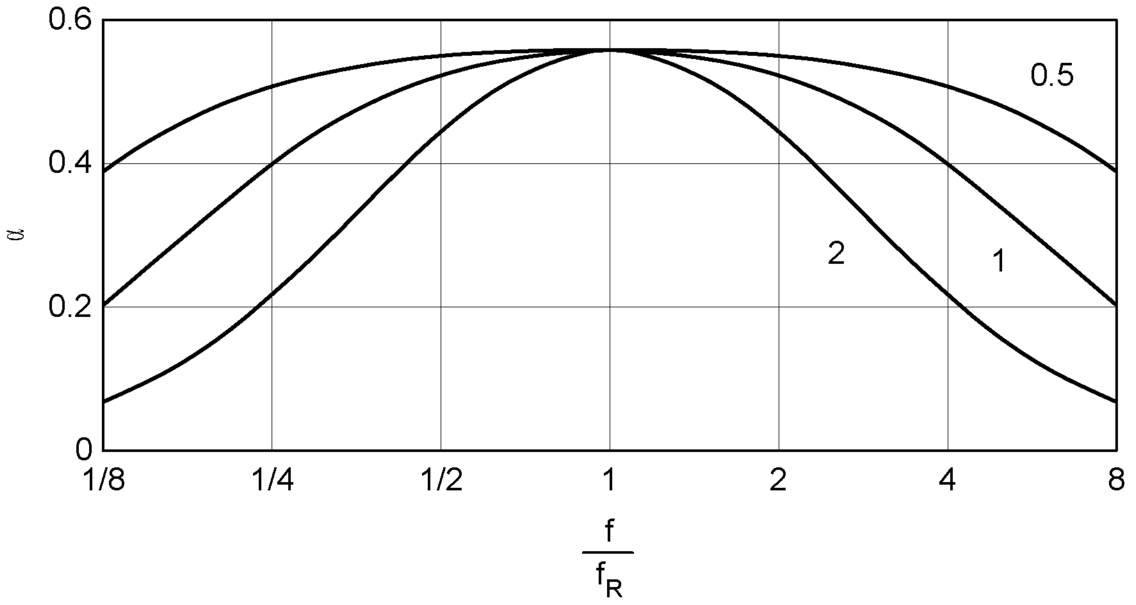
FIGS. 3D-3F show mechanical properties according another embodiment of the present invention of the absorption and the directivity sensitivity for open and closed end for rectangular and circular shaped vibration surfaces, respectively.

The proximal end 305 of the ossicle connector 300 is connected to the disc shape vibration surface 301 in the skin 308. The body of the ossicle connector 300 passes through a surgically excavated tunnel 310 in the skull bone 307 (via adjustment mechanism 306) and the distal end 304 of the ossicle connector 300 connects to an ossicle in the middle ear 103. The disc shape vibration surface 301 converts the incident sound wave striking the outer surface of the skin into corresponding (transversal) vibrations, which is dependent in a complicated way of many parameters. On the one hand side, the disc shape vibration surface 301 is separated by a distance d from the skull bone 208, 307 where the space between disc shape vibration surface 301 and skull bone 208, 307 forms a resonating cavity whose efficiency of converting the incident sound wave into (transversal) vibrations of the disc shape vibration surface 301 as a function of frequency f can be expressed by:

$$\alpha(f) = \frac{4r'}{(r'+1)^2 + (Z'_R F)^2}$$

where α is the absorption, r' is the damping by the skin 207, $Z'_R$ the resonating cavity resistance given by $Z'_R = \sqrt{\rho/(d \cdot m')}$ with ρ being the density of the skin 207 tissue which is typically in the range from 0.9 to 1.0 $g/cm^3$ and m' the mass of the disc shape vibration surface 301 per surface area and $F = f/f_r - f_r/f$ with $f_r$ the resonance frequency of the system formed by disc shape vibration surface 301, resonating cavity and damping through skin 207. In one embodiment m' is chosen such that the absorption α is equal or smaller than 0.5 with typical distances d and damping r'. In this embodiment, the resonance frequency $f_r$ may be chosen in the range from 400 to 800 Hz, preferable 600 Hz to achieve an efficiency of converting the incident sound wave into (transversal) vibrations of the disc shape vibration surface in the audible range from 50 Hz to 6400 Hz, as shown in FIG. 3D.

Another embodiment of the present invention is shown in FIG. 3C where disc shape vibration surface 301 is connected to an elastic layer 313. The elastic layer 313 may be fixated to the skull bone with any known means for fixation, such as for example by a bone screw 312. The elastic layer 313 may be of any suitable biocompatible silicone of suitable thickness. This arrangement has the advantage, that the absorption α can be much better adjusted through the properties of the elastic layer 313.

On the other hand side, the disc shape vibration surface 301 forms a vibrating membrane having certain natural vibration properties dependent on stiffness s, shape and the suspension, for example by the elastic layer 313. In one embodiment disc shape vibration surface 301 may have a circular shape, in this case there is only one fundamental natural resonance frequency $f'_r$:

$$f_r' = \frac{1}{2\pi}\sqrt{\frac{s}{m'}}$$

In this embodiment, the stiffness s and mass per surface area m' is chosen such that the resonance frequency $f'_r$ is in the range from 3000 Hz to 5000 Hz while maintaining resonance frequency $f_r$ in the above described regimen. In another embodiment the disc shape vibration surface 301 may be of rectangular shape with length $L_x$ and width $L_y$. In this embodiment two fundamental natural resonance frequencies exist and can be used to adjust the resonance frequency range. Changing the resonance frequency of the fundamental natural resonance frequency $f'_r$ has the advantage, that the directivity sensitivity can be selectively adjusted. In addition or alternatively, proximal end 305 of ossicles connector 300 may be connected at any antinode position on the vibrating disc shape vibration surface 301. This may improve transmitting sound through ossicles connector 300 to the ossicles, particularly in high frequencies.

Figure 3E:
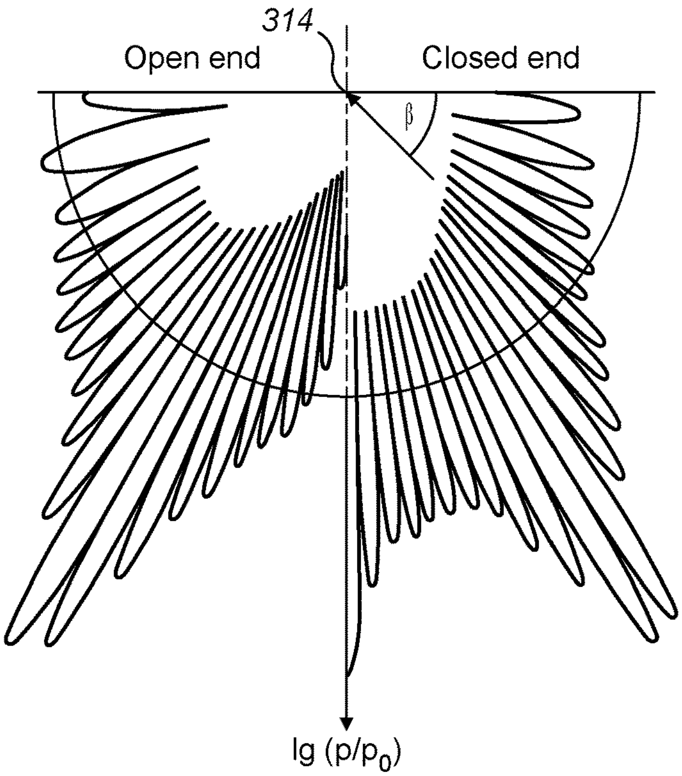
Figure 3F:
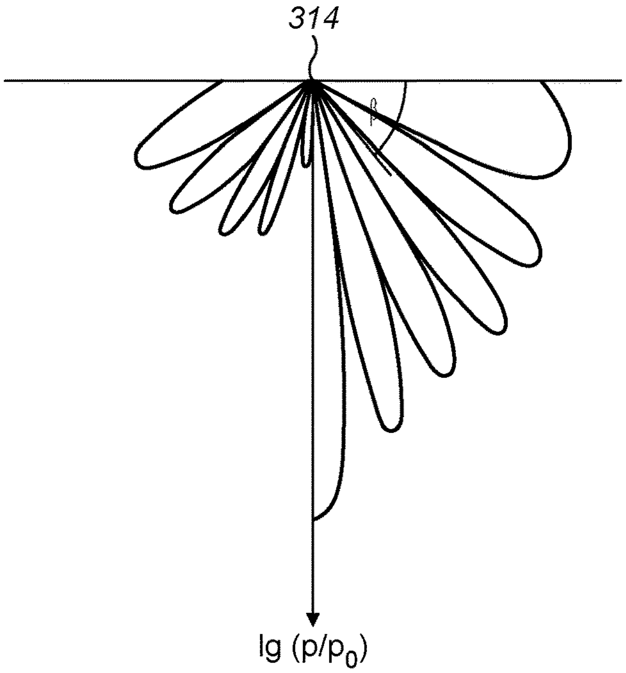

The directionality sensitivity of sound wave 314 and incidence angle β is shown in FIG. 3E for the rectangular shaped vibration surface 301 and in FIG. 3F for the circular shaped vibration surface 301, both for an open-ended configuration on the left side and closed ended configuration on the right side. Open-ended refers to the vibration surface being able to vibrate with its border and closed-ended configuration refers to the vibration surface not being able to vibrate with its border. Such an open-ended configuration is for example shown in FIG. 3C where the border of disc shape vibration surface 201 is elastically suspended by elastic layer 313. An alternative embodiment may be, that elastic layer 313 may have a rigid outer ring, such that the border of the disc shape vibration surface 201 overlaps with the rigid outer ring and prevents vibration of the border, i.e. forms a closed-ended configuration.

In further embodiments of the invention elastic layer 313 may have modulated elasticity over the area. For example, the elasticity is the biggest in the center and decreases radially toward the border. The border in this configuration may be substantial rigid. In another embodiment disc shape vibration surface 201 may in addition or alternatively have a modulated stiffness over the area. In one example the stiffness may be lowest at the center of the vibration surface 201 and increase toward the border. In another example, disc shape vibration surface 201 may have a rigid center portion, where for example the proximal end 205 of ossicles connector 202 is connected, and a lower stiffness radially toward the border.

FIGS. 3A-3B show structural details of a disc-shape vibration surface 301 and ossicle connector 300 according to another embodiment of the present invention that uses an active external component 309 and wherein the disc-shape vibration surface 301 is a permanent magnet embedded in the skin 308 over the skull bone 307. The proximal end 305 of the ossicle connector 300 is connected to the disc-shape vibration surface 301 in the skin 308. The body of the ossicle connector 300 passes through a surgically excavated tunnel 310 in the skull bone 307 (via adjustment mechanism 306) and the distal end 304 of the ossicle connector 300 connects to an ossicle in the middle ear 103.

An external active vibration component 309 is attached to the outer surface 308*a* of the skin 308 and configured to generate the sound vibrations for the disc-shape vibration surface 301. Specifically, the external active vibration component 309 contains an external vibration magnet 311 (actively driven by surrounding electromagnetic drive coils controlled by an external signal processor) that magnetically cooperates with the magnetic disc-shape vibration surface 301 to couple the sound vibrations through the skin 308. The external active vibration component 309 is fixedly attached to the outer surface 308*a* of the skin 308 via any known attachment mechanism such as by an attachment surface configured for adhesive attachment to the outer surface of the skin. Or there may be a separate implant magnet fixedly attached to the skull bone 307, and a separate external holding magnet that is contained within the external active vibration component 309, wherein the implant magnet and the external holding magnet magnetically cooperate to fixedly secure the external active vibration component 309 on the outer surface 308*a* of the skin 308.

Figure 4A:
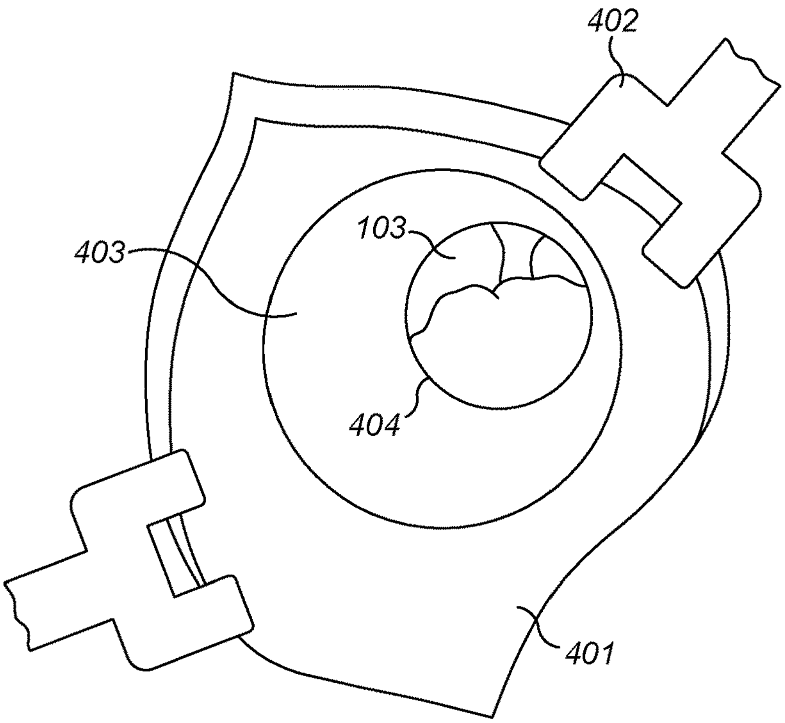
FIGS. 4A-4C show a typical surgical implantation process of a device according to an embodiment of the present invention.
Figure 4B:
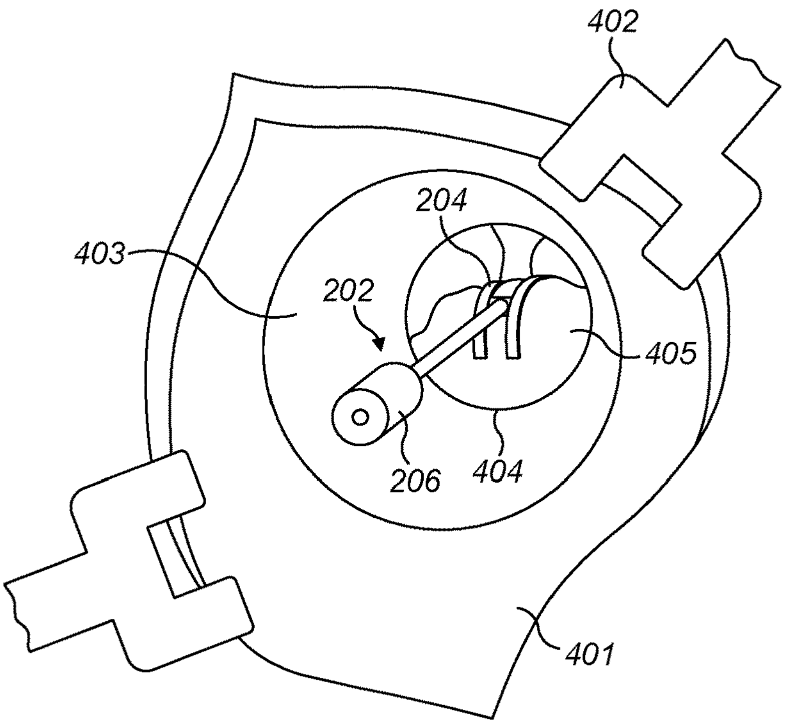
Figure 4C:
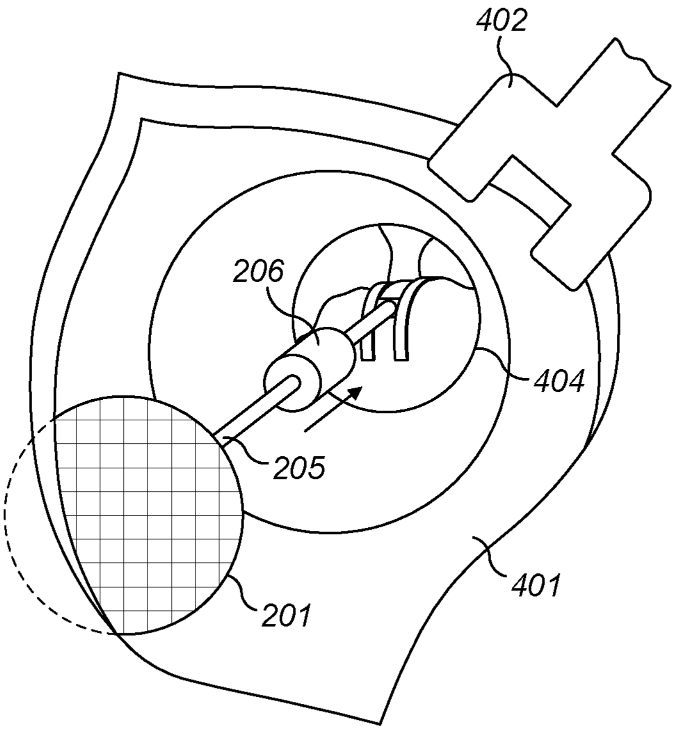

FIGS. 4A-4C show a typical surgical implantation process of a device according to an embodiment of the present invention. First, as shown in FIG. 4A, the surgeon makes an incision through the skin 401 behind the ear and uses surgical retractors 402 to expose the underlying skull bone 403. The surgeon then excavates (e.g., possibly using a robotic drill) an access tunnel 404 into the middle ear 103. The distal end 204 of the ossicle connector 202 is then connected to one of the exposed ossicles 405 (e.g., incus short process) leaving the female portion of the adjustment mechanism 206 protruding outside the access tunnel 404, FIG. 4B. The surgeon then fits the male portion of the adjustment mechanism 206 in with the proximal end 205 of the ossicle connector 202 connected to the disc-shape vibration surface 201 that is slid into position in the skin 401, FIG. 4C, and the incision is closed.

Figure 5A:
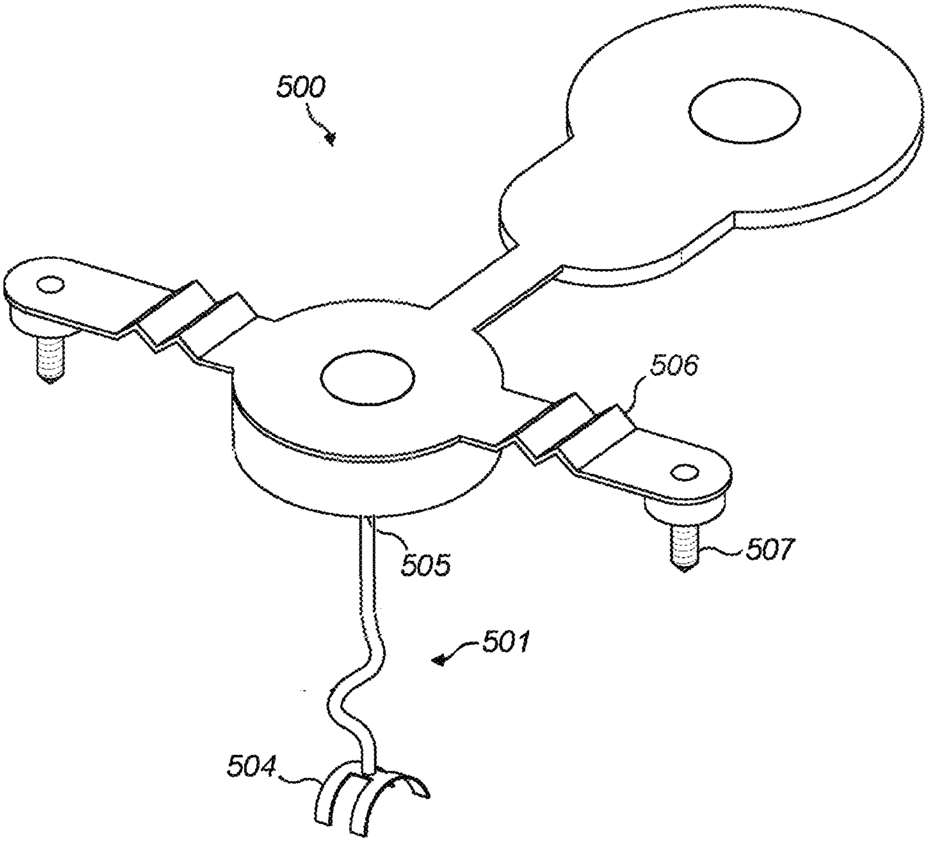
FIGS. 5A-5B show structural details of an ossicle connector attached to a bone conduction transducer according to another embodiment of the present invention.
Figure 5B:
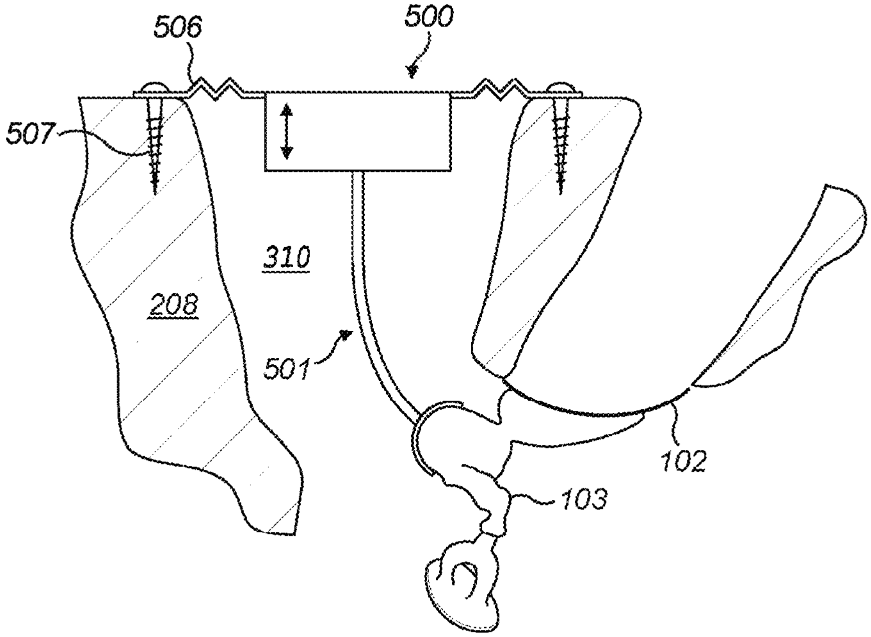

FIGS. 5A-5B show structural details of an ossicle connector 501 with a proximal end 505 attached to a bone conduction transducer 500 (e.g., Med-El's BoneBridge device) according to another embodiment of the present invention. A distal end 504 of the ossicle connector 501 connects to an ossicle in the middle ear 103. The ossicle connector 501 may be made of titanium, gold, or other stiff biocompatible material. The bone conduction transducer 500 is connected to the adjacent skull bone 208 by flexible connecting wings 506 and bone screws 507. This allows the vibrations of the bone conduction transducer 500 (e.g., responsive to communication signals from an external signal processor device, not shown) to be coupled by the ossicle connector 501 through the skin 207 in a mastoidectomy to the connected ossicle in the middle ear 103. At the same time, the separate natural acoustic hearing pathway via the tympanic membrane 102 is preserved.

Figure 6A:
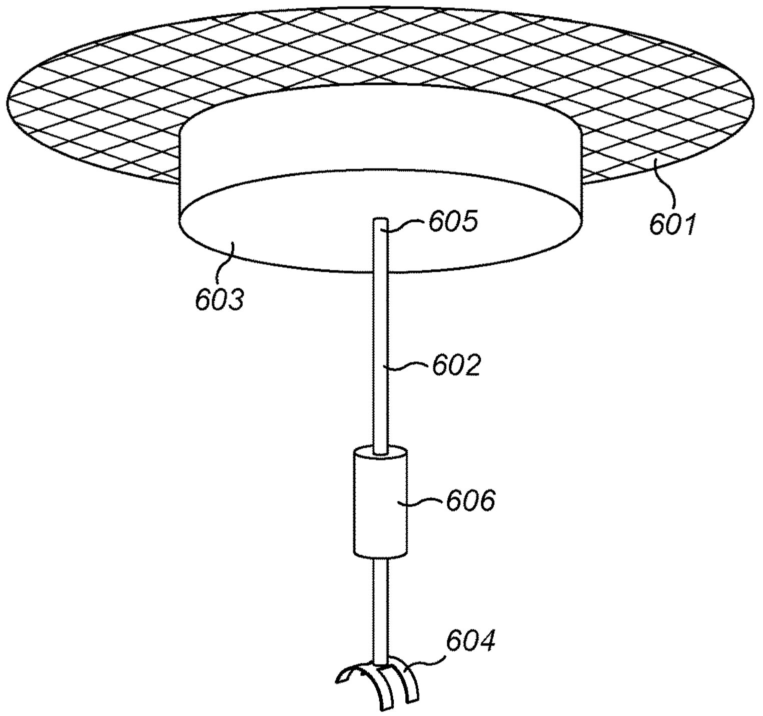
FIGS. 6A-6B shows structural details of other embodiments of the present invention with a permanent magnet mounted to the vibration surface.
Figure 6B:
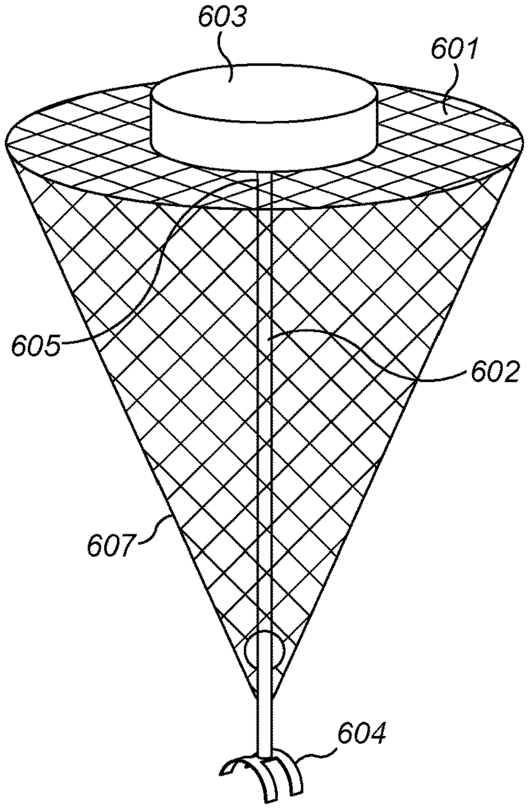

FIGS. 6A-6B show structural details of other embodiments of the present invention with a permanent implant magnet 603 mounted to the disc-shape vibration surface 601. A corresponding external drive magnet (not shown) placed on the skin over the implant magnet 603 then drives the implant magnet 603 and attached disc-shape vibration surface 601 to generate implant vibration signals that are coupled by the ossicle connector 602 from its proximal end 605 that is attached to the implant magnet 603 to its distal end 604 that is connected to the ossicle in the middle ear. The variant embodiment shown in FIG. 6B includes a conical shape supplement mesh 607 that surrounds the ossicle connector 602. Use of suitable stiffness material and geometry in the supplemental mesh 607 provides additional vibration coupling to the distal end 604 of the ossicle connector 602 and over time integrates into the soft skin tissue.

In one exemplary embodiment the passive hearing implant system may be an implantable microphone. In this embodiment an electroacoustic transducer may be coupled to the distal end of the rigid ossicles connector. Sound vibrations striking the outer surface of the skin create corresponding vibrations in the disc shape vibration surface, in the same way as described above, which are mechanically coupled at the proximal end to the rigid ossicles connector. The distal end of the rigid ossicles connector mechanically couples the vibrations to the electroacoustic transducer (instead of to the ossicles as described above) that converts the sound vibrations into a corresponding electrical output signal for processing by a total implantable hearing implant system. Such a total implantable hearing implant system can be any conventional known implant system type, such as a total implantable middle ear implant (T-MEI), a total implantable bone conduction implant (T-BCI), a total implantable cochlear implant (TICI) or a combination of any of these implant system types. Such a combination may include a bilateral hearing prosthesis, where for example the implants for each ear are communicatively interconnected.

Although various exemplary embodiments of the invention have been disclosed, it should be apparent to those skilled in the art that various changes and modifications can be made which will achieve some of the advantages of the invention without departing from the true scope of the invention.

What is claimed is:

1. A middle ear implant system comprising:

a disc-shape vibration surface configured for implantation in skin lying over a skull bone of a patient, with the disc-shape vibration surface parallel to an outer surface of the skin and to the skull bone, the disc-shape vibration surface configured to allow sound vibrations that strike the outer surface of the skin to create corresponding vibrations in the disc-shape vibration surface in the skin; and a rigid ossicle connector having a proximal end mechanically coupled to the disc-shape vibration surface and a distal end configured to connect to an ossicle in the middle ear of the patient, the rigid ossicle connector configured to allow vibrations of the disc-shape vibration surface to be mechanically coupled to the ossicle for perception by the patient as sound.

2. The system according to claim 1, wherein the disc-shape vibration surface is a mesh screen.

3. The system according to claim 2, wherein the mesh screen is made of titanium.

4. The system according to claim 1, wherein the ossicle connector has an adjustable length between the proximal end and the distal end.

5. The system according to claim 1, wherein the ossicle connector is made of titanium.

6. The system according to claim 1, further comprising:

an external active vibration component configured to attach to the outer surface of the skin and configured to generate the sound vibrations.

7. The system according to claim 6, wherein one of the disc-shape vibration surface and the external active vibration component includes a permanent magnet and the other includes a magnetic material configured to magnetically cooperate with the disc-shape vibration surface to couple the sound vibrations through the skin to the disc-shape vibration surface.

8. The system according to claim 6, wherein the external active vibration component includes an attachment surface configured for adhesive attachment to the outer surface of the skin to fixedly secure the external active vibration component to the outer surface of the skin.

9. The system according to claim 6, further comprising:

an implant magnet configured to fixedly attach to the skull bone; and an external holding magnet contained within the external active vibration component, wherein the implant magnet and the external holding magnet are configured to magnetically cooperate to fixedly secure the external active vibration component on the outer surface of the skin.

10. The system of claim 1, wherein the ossicle connector is configured to pass through a surgically created tunnel in the skull bone.

11. The system according to claim 1, wherein the distal end of the ossicle connector is configured to connect to the ossicle so as to preserve a normal hearing pathway from the tympanic membrane of the patient.

12. The system of claim 1, wherein the disc-shape vibration surface has a rectangular shape or a circular shape.

13. The system of claim 1, wherein the ossicle connector includes a magnetic coupling including a first holding magnet connected with the proximal end and a second holding magnet connected with the distal end to releasably connect the proximal end with the distal end of the ossicle connector.

14. The system of claim 1, wherein the ossicle connector includes an adjustment mechanism configured to allow a length of the ossicle connector to be adjusted when implanting the middle ear implant system.

15. The system of claim 1, further comprising an elastic layer connected to the disc-shape vibration surface and configured to fixedly attach to the skull bone.

* * * * *